US012358420B2

(12) United States Patent
Taylor et al.

(10) Patent No.: US 12,358,420 B2
(45) Date of Patent: Jul. 15, 2025

(54) DISPLAY SYSTEM FOR USE IN CONJUNCTION WITH DRIVER PROTECTION APPARATUS

(71) Applicant: Impressive Ideas Limited, London (GB)

(72) Inventors: Christopher Taylor, Maidenhead (GB); Lucas Di Grassi, Monaco (MC)

(73) Assignee: Impressive Ideas Limited, London (GB)

( * ) Notice: Subject to any disclaimer, the term of this patent is extended or adjusted under 35 U.S.C. 154(b) by 901 days.

(21) Appl. No.: 16/960,961

(22) PCT Filed: Jan. 11, 2019

(86) PCT No.: PCT/GB2019/050082
§ 371 (c)(1),
(2) Date: Jul. 9, 2020

(87) PCT Pub. No.: WO2019/138247
PCT Pub. Date: Jul. 18, 2019

(65) Prior Publication Data
US 2020/0361316 A1    Nov. 19, 2020

(30) Foreign Application Priority Data
Jan. 11, 2018    (GB) ...................... 1800423

(51) Int. Cl.
*B60Q 1/00*    (2006.01)
*B60K 35/00*    (2006.01)
(Continued)

(52) U.S. Cl.
CPC ............ *B60K 35/00* (2013.01); *B60Q 1/2661* (2013.01); *B60Q 1/543* (2022.05); *B60R 16/03* (2013.01);
(Continued)

(58) Field of Classification Search
CPC .............. B60K 35/00; B60K 2370/152; B60K 2370/167; B60K 2370/332; B60Q 1/2661; B60Q 1/543; B60R 16/03; B60R 21/11
(Continued)

(56) References Cited

U.S. PATENT DOCUMENTS 4,999,604 A * 3/1991 Crews ...................... G07C 1/24
340/988
5,241,487 A * 8/1993 Bianco .................... G04F 10/00
368/6
(Continued)

OTHER PUBLICATIONS

International Search Report and Written Opinion for PCT/GB2019/050082 issued Apr. 3, 2019.
(Continued)

*Primary Examiner* — Tai T Nguyen
(74) *Attorney, Agent, or Firm* — GableGotwals (57) ABSTRACT

The present invention provides a vehicle including driving protection apparatus which is located at or adjacent to the position of the driver when operating the vehicle. There is provided, in location with or adjacent to the driver protection apparatus, visual display means which are selectively operated to provide an indication of the condition of the vehicle and/or driver of the vehicle and/or the environment in which the vehicle is located at a particular instant of time.

10 Claims, 6 Drawing Sheets

(51) Int. Cl.
   *B60Q 1/26* (2006.01)
   *B60Q 1/50* (2006.01)
   *B60R 16/03* (2006.01)
   *B60R 21/11* (2006.01)
   B60K 35/22 (2024.01)
   B60K 35/28 (2024.01)

(52) U.S. Cl.
   CPC .............. *B60R 21/11* (2013.01); *B60K 35/22* (2024.01); *B60K 35/28* (2024.01); *B60K 2360/167* (2024.01); *B60K 2360/332* (2024.01); *B60K 2360/338* (2024.01); *B60K 2360/349* (2024.01); *B60Q 1/5035* (2022.05)

(58) Field of Classification Search
   USPC ............................................... 340/425, 425.5
   See application file for complete search history.

(56) References Cited

U.S. PATENT DOCUMENTS

| | | | |
|---|---|---|---|
| 6,411,205 B1* | 6/2002 | Reid | G07C 1/24 340/425.5 |
| 7,175,306 B2 | 2/2007 | Pan | |
| 8,016,653 B2* | 9/2011 | Pendleton | A63F 13/45 463/31 |
| 11,035,609 B2* | 6/2021 | Swab | F25D 27/005 |
| 2004/0095228 A1 | 5/2004 | Fugit | |
| 2013/0140883 A1* | 6/2013 | Tawada | H02J 7/00 307/9.1 |
| 2015/0032294 A1* | 1/2015 | Randoll | A63G 33/00 701/2 |
| 2015/0298570 A1* | 10/2015 | Hisano | B60W 50/082 701/22 |
| 2021/0156536 A1* | 5/2021 | Adams | H05B 45/56 |

OTHER PUBLICATIONS

Laurence Edmondson: "What is Halo and why is it being introduced in F1 for 2018?", Jul. 20, 2017.

* cited by examiner

DISPLAY SYSTEM FOR USE IN CONJUNCTION WITH DRIVER PROTECTION APPARATUS

CROSS-REFERENCE TO RELATED APPLICATIONS

This application is the US National Phase of PCT Application No. GB2019/050082 filed Jan. 11, 2019 which claims priority to British Patent Application No. GB 1800423.4 filed 11 Jan. 2018, each of which is incorporated herein by reference.

BACKGROUND OF THE INVENTION

The invention to which this application relates is a display system which can be used in conjunction with driver protection apparatus and, particularly, although not necessarily exclusively, with driver protection apparatus for use with racing vehicles in a race situation. Yet further, the invention is of particular use in relation to driver protection apparatus which is fitted in position in an open cockpit of a vehicle in which the driver is located and in which case the driver is conventionally protected by wearing a helmet. The driver protection apparatus is additionally installed to the body of the vehicle to provide further protection for the driver from debris on the track and/or from other vehicles.

The requirement for driver safety to be improved, means that there is always a demand to provide driver protection apparatus which allows greater protection for the driver, and in particular the head and neck of the driver, which protrude from the open cockpit of the vehicle and are therefore exposed whilst, at the same time, ensuring that the ability of the driver to have clear vision so as to be able to safely drive the vehicle, particularly in race conditions, is maintained. One such system of driver protection apparatus is currently being implemented in at least Formula 1 and Formula E race participating vehicles and is referred to as the HALO system. The HALO apparatus is in effect, a wishbone shaped frame which is positioned around and above the periphery of the front and sides of the open cockpit of the vehicle and includes a central member in front of the drivers head which leads to diverging second and third members which pass to opposing sides of the cockpit and driver and the free ends of the second and third members are located to the respective rear sides of the cockpit on the vehicle body.

The frame members therefore effectively form a barrier to prevent medium to large sized debris from reaching the driver by deflecting the same. The spaces defined between the said first, second and third members, and the vehicle body, are typically open but, in another embodiment, there may be provided a screen or shield which is transparent.

It is believed by the majority of skilled persons, that the provision of the driver protection apparatus will improve the safety of the driver whilst ensuring that the clarity of vision required to operate the vehicle in race conditions, is not unduly affected.

BRIEF SUMMARY OF THE INVENTION

The aim of the present invention is to provide further usage of the driver protection apparatus which can be used to further improve the indication of the condition of the vehicle, to make onlookers aware of the condition of the vehicle at a particular time and/or to allow the condition of the vehicle to be indicated automatically, in conjunction with further apparatus which may be provided during the race condition and/or the provision of display data and feedback.

In a first aspect of the invention, there is provided a vehicle, said vehicle including driving protection apparatus which is located at or adjacent to the position of the driver when operating the vehicle and wherein there is provided, in location with or adjacent to the said driver protection apparatus, visual display means which are selectively operated to provide an indication of the condition of the vehicle and/or driver of the vehicle and/or the environment in which the vehicle is located at a particular instant of time.

In one embodiment, the display means include one or a plurality of light sources which are located on or adjacent to the driver protection apparatus and a power source which may be provided from the vehicle or may be provided independently of the vehicle power source, and control means which allow the selective illumination of some or all of the light sources.

In one embodiment, the control means are provided to allow the selective illumination of certain, all, or none, of the light sources and/or change the colour and/or intensity of light which is emitted from the light sources at a particular instant of time and to display data. The particular selection which is made is indicative of the condition of the vehicle and/or environment at that instant of time and is in response to data signals received from the vehicle control system and/or apparatus remote from, but in communication with, the vehicle control system which allows data relating to, for example, a race in which the vehicle is competing to be passed and used to define the particular display which should be generated.

In one embodiment, the particular colour, intensity or range of light sources which are illuminated and/or sequence of illumination, is selected from a range of possible options and an index is provided which allows an onlooker, having viewed the particular display at that instant of time, to refer to the index and identify the particular condition which is linked to the particular visual display.

In one embodiment, the driver protection apparatus is of the type known as the HALO system and includes a plurality of frame members which are spaced apart and are selectively located or formed integrally with the body of the vehicle and the said light sources are selectively located on the said members.

In one embodiment, the lights sources are LEDs.

In one embodiment, the LED lights are provided in strips and are located in a channel on the said members. In one embodiment shielding is provided and/or the light sources are located with respect to the driver and body of the vehicle so as to avoid the light which is emitted from causing flare on the body of the vehicle and/or flare to the driver so that when illuminated, the light sources do not unduly distract the driver during operation of the vehicle.

In one embodiment, the light sources are illuminated sequentially to provide a continuous scrolling display indicating alphanumeric data.

In one embodiment, the condition of the vehicle which is indicated is related to one or more operating parameters of the vehicle, such as, available power; whether the vehicle is operating in a particular mode; whether there is a fault, or the like. In addition, or alternatively, the condition of the vehicle which is indicated is the particular position of the vehicle in a race in which the same is participating at that instant of time; whether the vehicle is the subject of a penalty which has been imposed by race organisers during the race or other environmental conditions such as a rain affected race, a collision affected race or indeed any other parameter which is relevant to the race and/or onlookers.

Thus, in accordance with the invention, there is provided a display system which allows an audience of a race to be aware of a particular condition of the vehicle at a particular instant of time. The audience may include any or any combination of mechanics and/or other personnel linked to a particular vehicle who can, upon viewing a particular display, identify a particular fault or condition of the vehicle, members of the public who have paid to be present at the race venue to watch the race and who can then identify a particular condition in relation to each of the vehicles in the race and/or may be viewers who are watching the race at a remote location via a broadcast and in this embodiment, may be able to view the display means on the vehicle and possibly via a further display means generated on the display screen to indicate the same visual display and/or to indicate to the viewer what the particular visual display represents in terms of the condition of the specific vehicle.

In a further aspect of the invention, there is provided a display system for use with driver protection apparatus, the said display system includes a plurality of light sources mounted on one or more frame members of the driver protection apparatus which is provided with means to allow the same to be mounted with a vehicle or is formed integrally with the body of the vehicle or another component thereof.

In another aspect of the invention there is provided a vehicle with a display system to indicate the condition of the vehicle and/or environment in which the vehicle is present at an instant of time, said display system including a plurality of lights which are selectively illuminated to indicate a particular condition from a range of possible conditions for the said vehicle.

BRIEF DESCRIPTION OF THE DRAWINGS

Specific embodiments of the invention are now described with reference to the accompanying drawings; wherein.

DETAILED DESCRIPTION OF THE INVENTION

Figure 1:
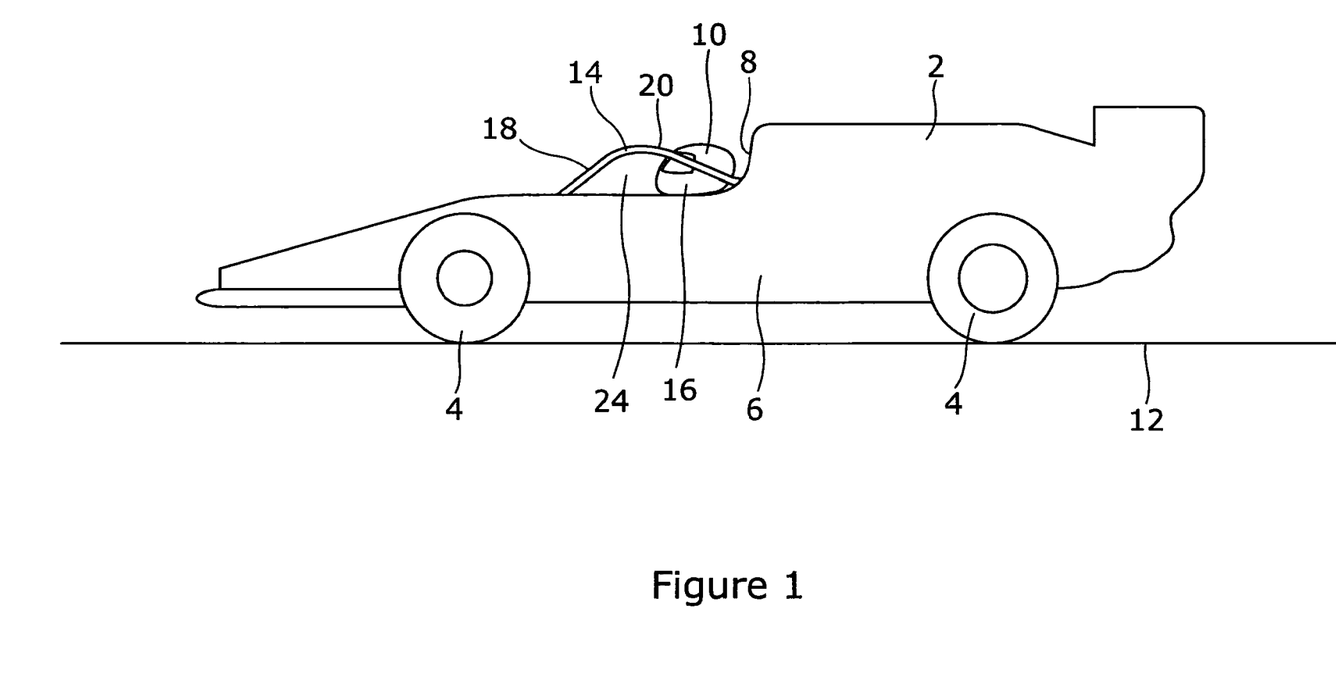
FIG. 1 illustrates a vehicle with driver protection apparatus provided therewith in accordance with one embodiment.
Figure 2A:
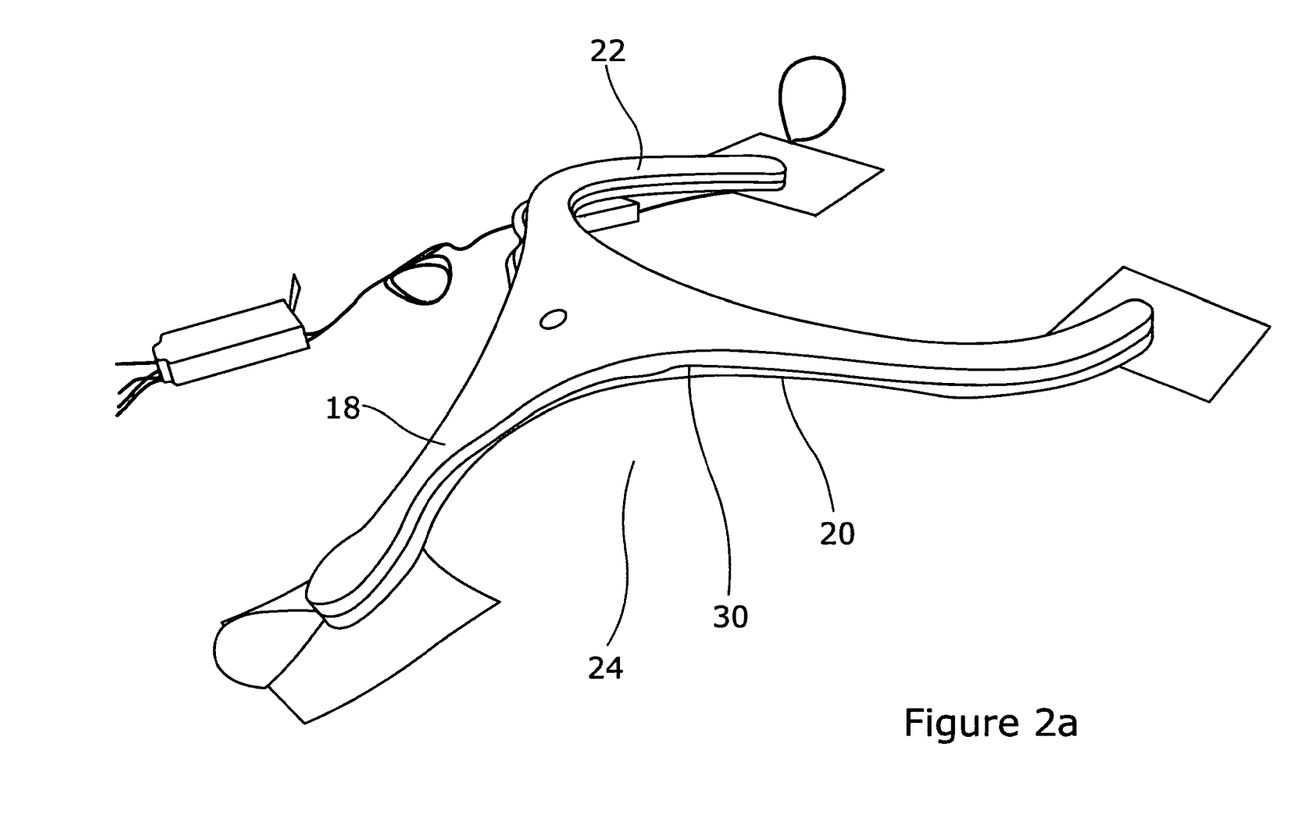
FIGS. 2a-d illustrate the driver protection apparatus of FIG. 1 removed from the vehicle and including a display system in accordance with one embodiment of the invention.
Figure 2B:
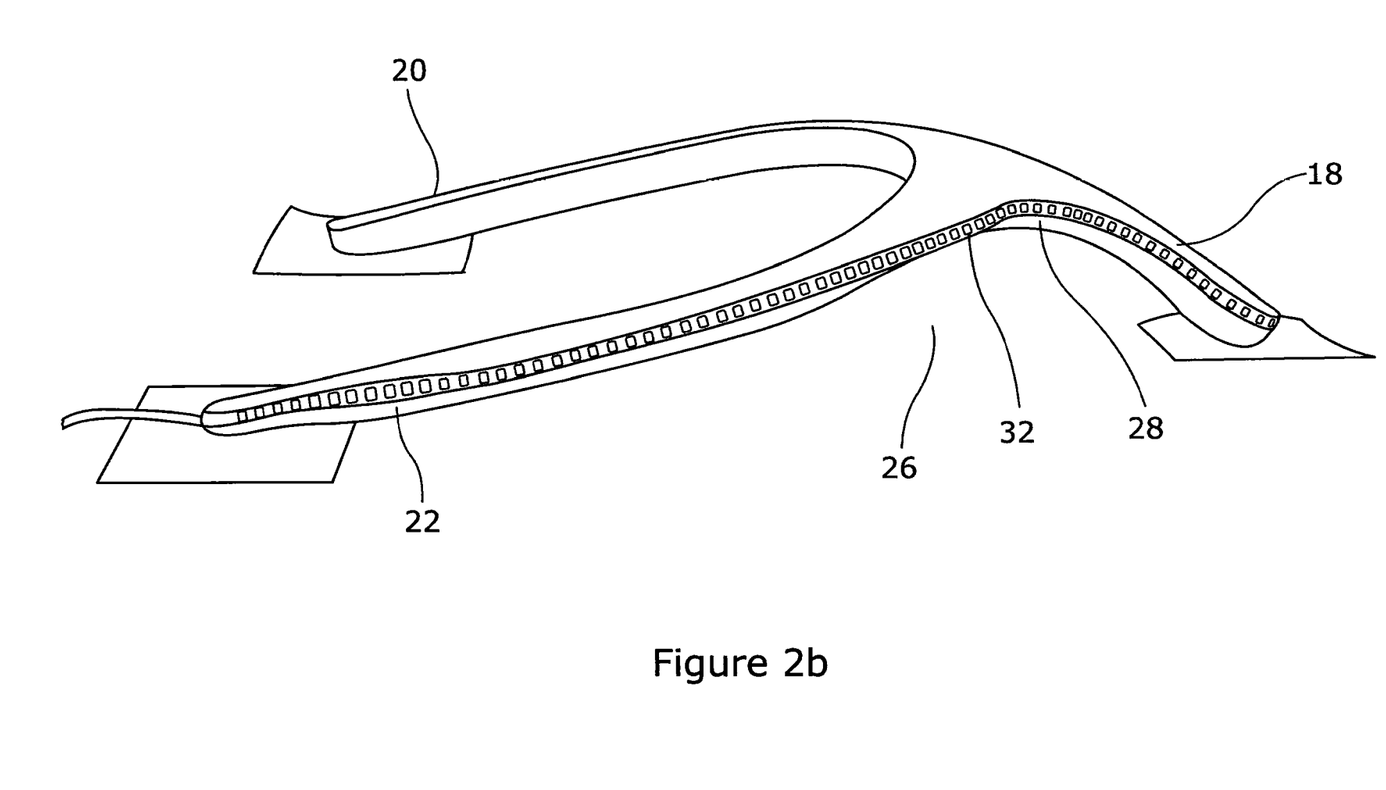
Figure 2C:
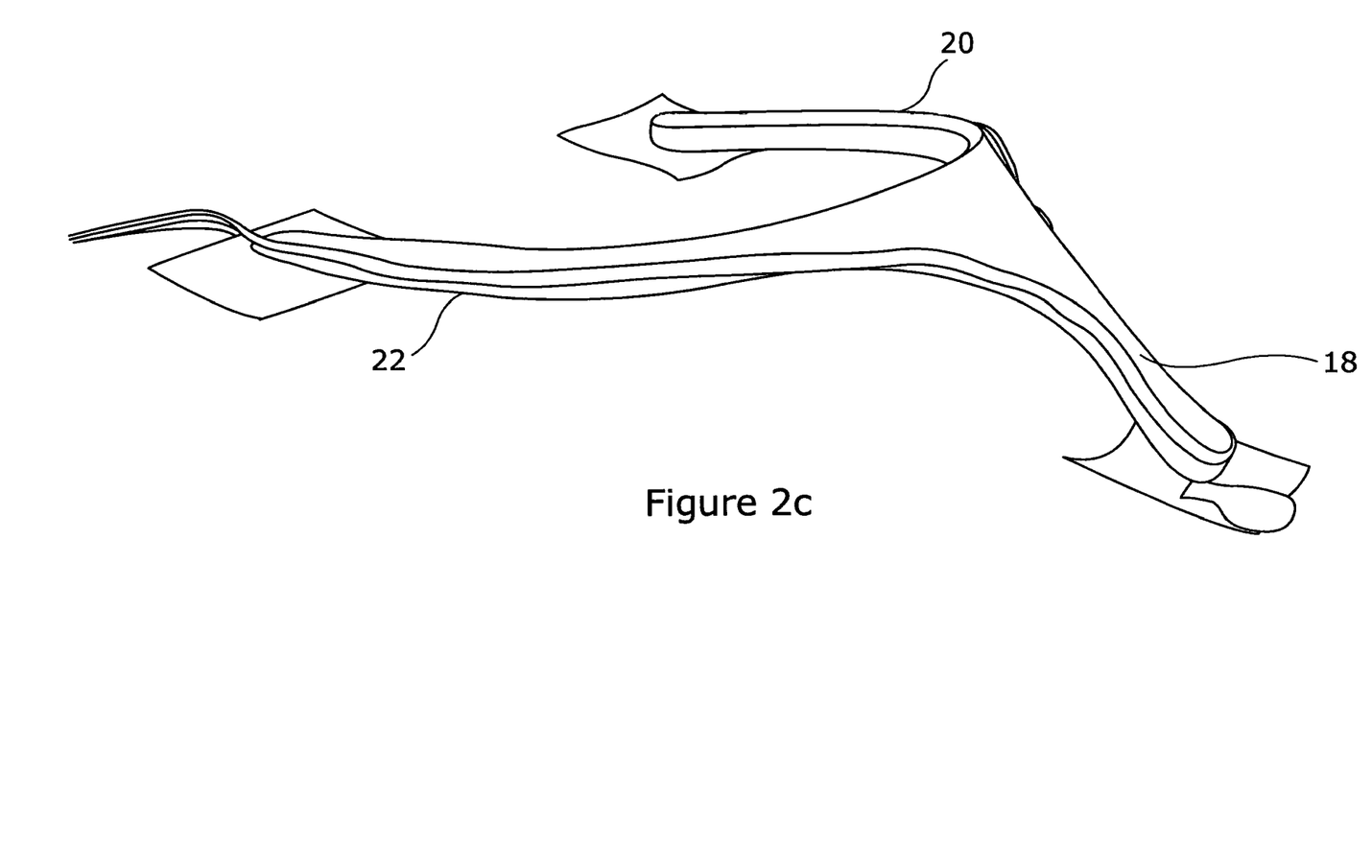
Figure 2D:
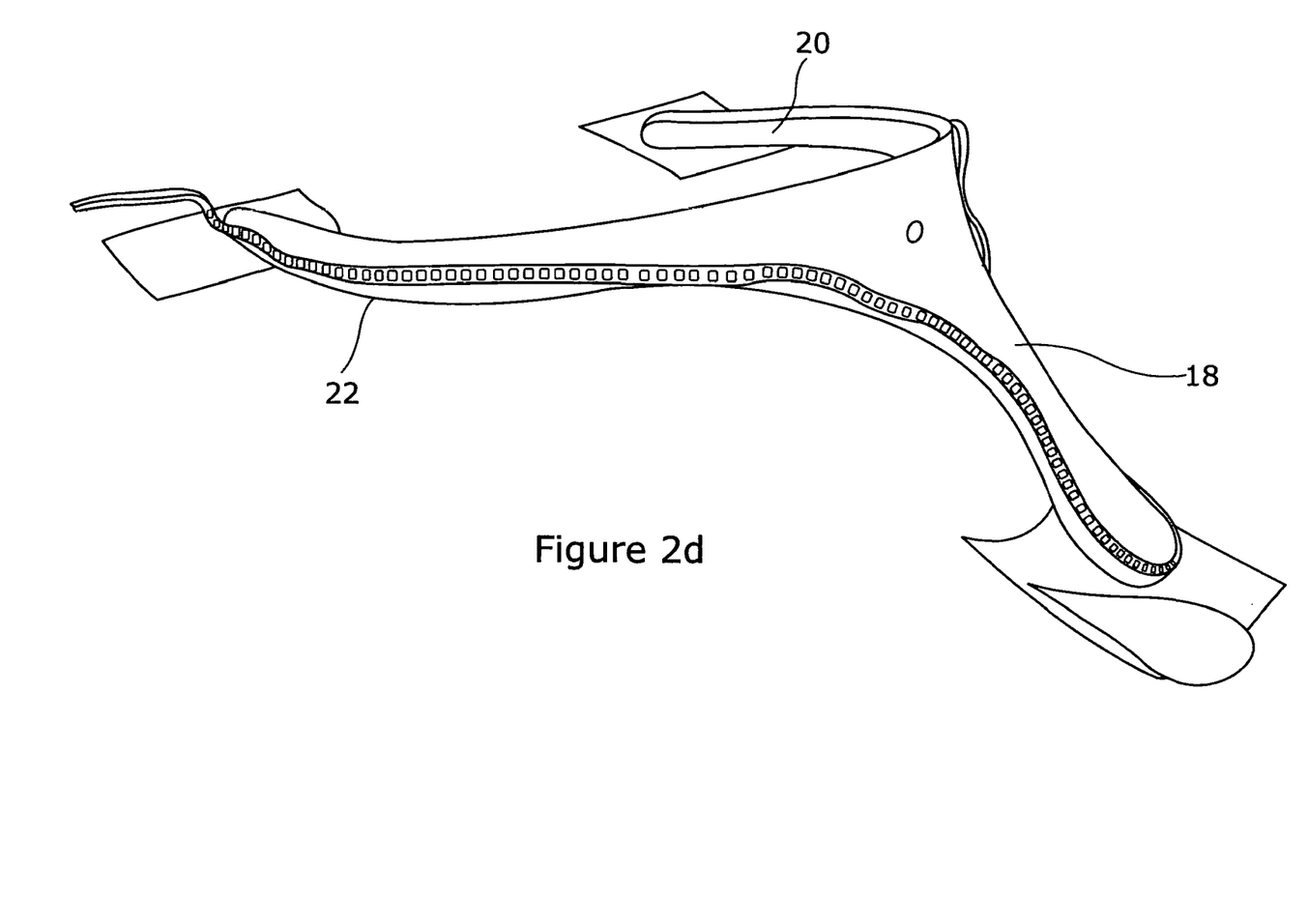

With reference to FIG. 1 there is illustrated one form of vehicle in relation to which the current invention can be used. In this embodiment there is illustrated a car racing vehicle 2 which comprises wheels 4, a body 6, in which there is included an engine or and drive, power and control components in a conventional manner. The body 6 has an open cockpit 8, in which there is provided a seat and steering wheel for use by a driver 10 when in position in the vehicle to race the same on a track 12. In addition, the open cockpit has fitted in conjunction therewith, driver protection apparatus, 14 which is provided to enhance protection for the driver during operation of the vehicle. The driver typically wears a helmet 16 when driving the vehicle 2 due to the fact that the cockpit 8 is open.

The driver protection apparatus 10 in this embodiment is formed by a plurality of frame members 18, 20 and 22, with the first frame member 18 depending upwardly and in front of the driver and joining with the second and third frame members 20, 22 which pass to either side of the driver's helmet 16 to be attached at the rear of the open cockpit 8 of the vehicle 2. The spaces 24, 26 between the said members 18, 20, 22 and the vehicle body 6 are open and it is found that the frame members 18, 20, 22 act to deflect debris which may come from the track or other vehicles away from the driver's head and neck and hence provide protection for the same.

The driver protection apparatus is shown in more details in FIGS. 2a-2d and is shown in accordance with an embodiment of the current invention in which there is provided, in this embodiment, on each of the frame members 18, 20, 22, visual display means 28 in the form of a plurality of light sources, which in this case, are LED light sources provided in a strip with portions 30, 32 located on opposing sides of the vehicle when the driver protection apparatus is located with the same. The strip extends along the external faces 34 of the frame members 18, 20, 22 and therefore allows the same to be viewable from the sides and front of the vehicle 2. Furthermore, as the driver protection apparatus 10 extends upwardly from the vehicle body 6, the same is highly visible and so the display means 28 when fitted thereon are also visible.

Figure 3:
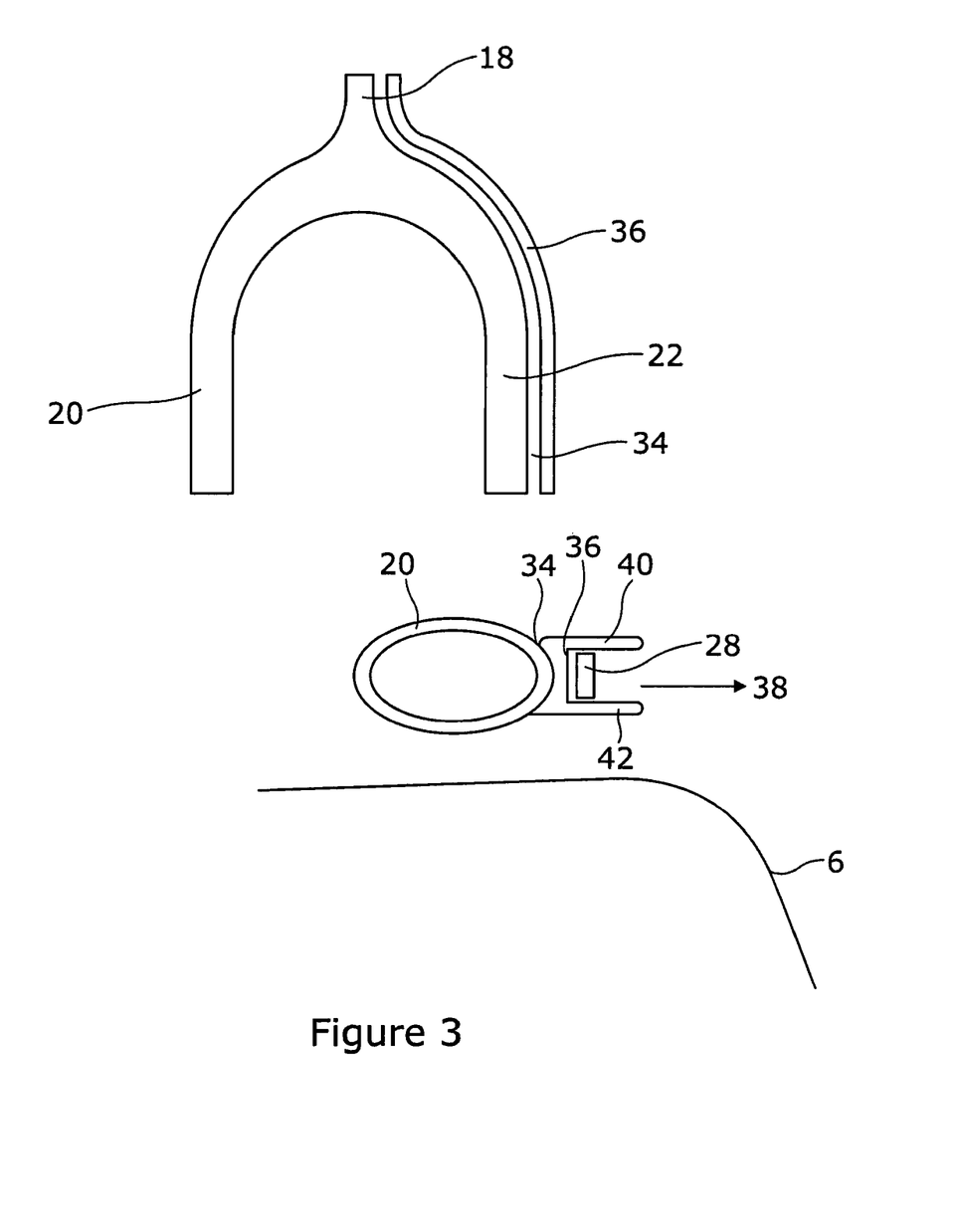
FIG. 3 illustrates the display system of FIGS. 2a-d in greater detail.

FIG. 3 illustrates the display means 28 in location in a channel 36 attached to or formed in the frame members 18, 20, 22 and it is also seen that the light which is emitted from the light sources is directional in the direction of arrow 38, away from the frame members 18, 20, 22, the vehicle body 6 and the driver so that when illuminated, the lights sources do not unduly distract the driver.

The channel 36 includes shields 40, 42 which act to retain the display means 28 in position and also act to limit the extent by which light can extend to the body 6 of the vehicle and/or the driver and hence prevent light flare being created. The channel 36 can be shaped to match the shape of the members of the driver protection apparatus and can be bonded to the same with the strip of light sources bonded into the channel.

In accordance with the invention, the particular lighting display which is provided by the operation of the display means 28, can be selected to suit particular requirements and, in one embodiment may simply be to indicate that the particular vehicle is operational and taking part in the race in which case a solid colour may be displayed. In more complex uses, the particular display is selected to identify a particular condition of the vehicle at that instant of time and can generate a scrolling display showing alpha numeric data.

In one embodiment the light sources are provided on the outside edge and/or top of the driver protection apparatus 10 and the light sources can be Ultrabright LED light sources and/or multi-coloured Red Green and Blue light sources.

In one embodiment the unit is powered either from an independent battery or from the vehicle's power supply. Power drain is not that great if LEDS are used. The batteries and control means for the operation of the light sources can be remotely located in the vehicle and connected by a lead. The batteries can be rechargeable to minimise maintenance needs.

Typically the display means interact with the vehicle when it is in different modes. For instance, most racing vehicles have CAM bus programme software and an interface is provided to allow where the light source display system to connect to the CAM bus system so that information relating to the vehicle condition can be automatically sent to the lights. In some cases programmable control means may be required to convert the CAM bus signal into the software format needed to drive the display system and DMX is one example of the type of software that could be used for this purpose.

In one example of use the race organisers transmit to the vehicle display system a signal that would indicate:—which vehicle is leading the race and which in this example causes the display system for that vehicle to create a chosen colour light display, such as for example blue. Similarly the display system for the vehicle which has done the fastest lap is controlled to create a chosen colour, such as purple. Those vehicles which are in a boost mode generate a signal to the display system which causes the light sources to be operated to generate a chosen colour such as red. If the car has been given a penalty the display system operates the lights to flash in a chosen colour such as green.

In addition or alternatively the display system lights can be selectively operated to indicate fuel and/or power levels and any number of different conditions of the vehicles. Thus there is a wide range of options on which colour is used to display which setting.

It is also possible to have different sections of the light display showing different colours, for instance, blue on one side, green on the other and the display can be controlled to pulse so that it can appear that the light is moving left to right, front to back etc.

The benefit is that the audience both on television and at the races would have a visual indication of the cars state via the display means which enhances the audience experience and by providing the same in the manner described in accordance with the invention ensures that the safety of the driver is improved by allowing the utilisation of the driver protection apparatus.

The invention claimed is:

1. A vehicle, said vehicle comprising:
a driver protection apparatus located at or adjacent to a position of a driver's head when operating the vehicle,
said driver protection apparatus including a plurality of frame members selectively located or formed integrally with a body of the vehicle,
a visual display system including one or a plurality of light sources located on at least one of said plurality of frame members which are selectively operated to provide an indication of available power of the vehicle, and
wherein the visual display system and the vehicle interact to allow signals of information relating to the available power of the vehicle to be sent from the vehicle to the visual display system to operate the one or more light sources to indicate an increase of the available power to move the vehicle to a power boost mode at a particular instant of time and to automatically send a signal of information indicating a change to the power boost mode of operation of the vehicle to change the visual display system for a duration of a provision of the power boost mode of the available power of the vehicle.

2. A vehicle according to claim 1, further including a power source provided from the vehicle independently of the vehicle power source, and control means which allow a selective illumination of some or all of the light sources.

3. A vehicle according to claim 2, wherein the control means are provided to allow the selective illumination of certain, all, or none, of the light sources, a change of colour, intensity of light emitted from the light sources at said particular instant of time and to display data.

4. A vehicle according to claim 1, wherein a particular colour, intensity or range of light sources which are illuminated, sequence of illumination, is selected from a range of possible options and an index is provided which allows an onlooker, having viewed a particular display at that instant of time, to refer to the index and identify a particular condition which is linked to the particular display.

5. A vehicle according to claim 1, wherein the driver protection apparatus is of a type known as the HALO system.

6. A vehicle according to claim 1, wherein the light sources are LEDs.

7. A vehicle according to claim 1, wherein the light sources are LEDs and are provided in strips and are located in a channel on the plurality of frame members.

8. A vehicle according to claim 5, wherein shielding is provided and the light sources are located with respect to the driver and body of the vehicle so as to avoid the light which is emitted from causing flare on the body of the vehicle and flare to the driver so that when illuminated, the light sources do not unduly distract the driver during operation of the vehicle.

9. A vehicle according to claim 1, wherein the plurality of light sources are illuminated sequentially to provide a continuous scrolling display indicating alphanumeric data.

10. A vehicle according to claim 1, wherein the display system also indicates a particular position of the vehicle in a race in which the vehicle is participating at that instant of time, whether the vehicle is a subject of a penalty which has been imposed by race organisers during the race, or other environmental conditions such as a rain affected race, a collision affected race or any other parameter which is relevant to the race and onlookers.

* * * * *